Patented Apr. 21, 1942

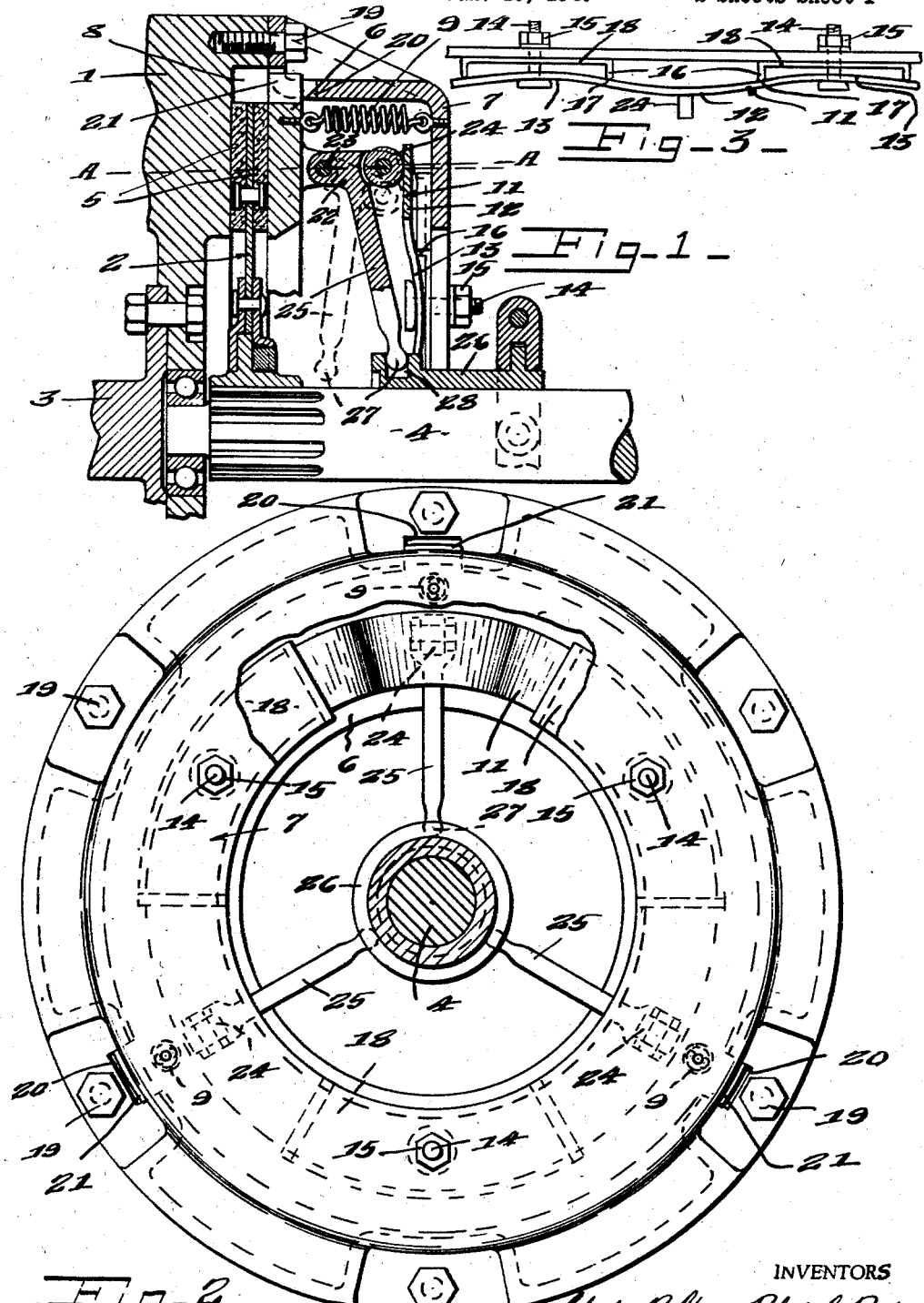

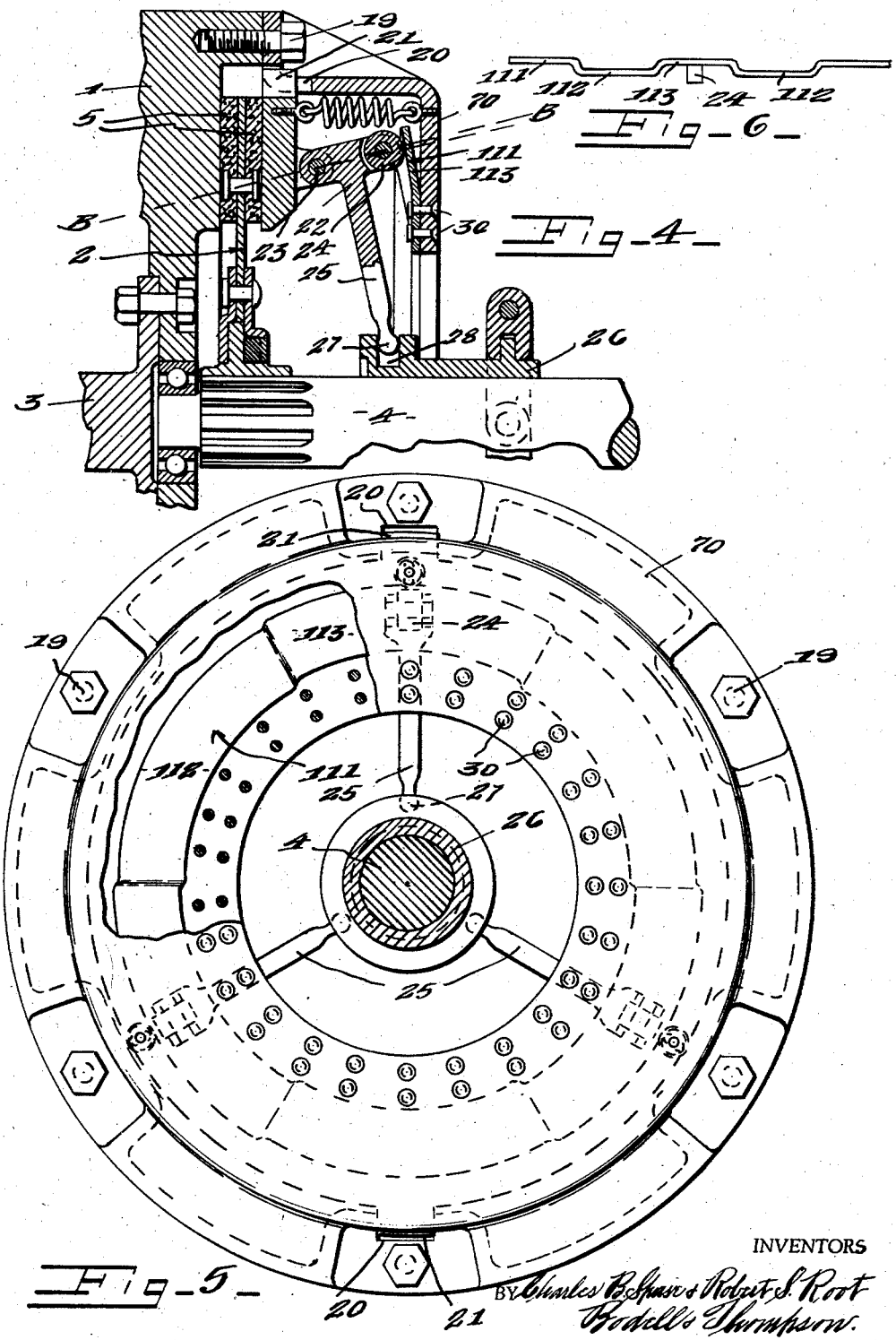

2,280,356

UNITED STATES PATENT OFFICE 2,280,356

FRICTION CLUTCH

Charles B. Spase, Nedrow, and Robert S. Root, Syracuse, N. Y., assignors to W. C. Lipe, Inc., Syracuse, N. Y., a corporation of New York Application January 19, 1940, Serial No. 314,664

4 Claims. (Cl. 192—68)

This invention relates to friction clutches of the type used in motor vehicles and similar situations, and particularly to clutches, when in "off" position remain in "off" position, and when in "on" position are held "on" without the usual clutch spring or springs, and has for its object a clutch in which the operating mechanism involves a lever element or elements which moves into or beyond dead center lines when the clutch is engaged.

It further has for its object a clutch in which the levers, which hold the clutch engaged, when in dead center line, thrust against a thrust ring, preferably having some resiliency, which thrust ring is readily adjustable to take up for the clutch wear.

It further has for its object a thrust ring, and the adjusting means therefor, hereinafter described.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a fragmentary longitudinal sectional view of a clutch embodying this invention.

Figure 2 is an enlarged rear elevation, partly broken away and partly in section, looking to the left in Figure 1.

Figure 3 is a fragmentary diagrammatic view of the thrust ring and contiguous portions of the back plate element seen in Figures 1 and 2.

Figure 4 is a view similar to Figure 1 of a slightly different embodiment of the invention with respect to the thrust ring and the adjustment therefor.

Figure 5 is an elevation, partly in section and partly broken away, looking to the left in Figure 4.

Figure 6 is a fragmentary diagrammatic view of the thrust ring.

The clutch comprises, generally, driving and driven members, a pressure ring element and a back plate element rotatable with one of said members, usually the driving member; a clutch shaft, the other of said clutch members being a friction disk mounted on the clutch shaft and extending between the former member and the pressure ring element, and the invention relates to clutch operating means including levers, each pivoted at one end to one of said elements, preferably the pressure ring element, and coacting at its other end with a thrust surface carried on the other element or back plate, and initially arranged in locking position in or near dead center lines passing through the pivotal point of the lever and the point of engagement with the thrust ring, when the clutch is engaged, the levers being shiftable about their pivots out of said center lines to disengage the clutch.

1 designates the driving member; 2 the driven member; 3 the shaft, as the engine shaft to which the driving member is secured; 4 the clutch shaft on which the driven member is slidably splined, this driven member being a disk having friction faces 5 on opposite sides thereof.

6 is a pressure ring element and 7 a back plate element. The pressure ring element 6 is rotatable with the driving member 1 and is here shown as interlocked with the back plate 7 which is secured to the driving member 1. The driven member 2 extends between the bottom of a recess 8 in the driving member 1 and the pressure ring. Suitable springs 9 are connected to the pressure ring 6 and to the back plate 7 to quickly relieve the driven member 2 of the pressure ring when the throw-out or operating mechanism of the clutch is operated to "off" position.

11 designates a thrust ring which, in the illustrated embodiment of the invention, is shown as carried by the back plate 7, this ring being distorted or waved out of the normal plane to form alternating high portions 12 and low portions 13, these, in the constructions shown in Figures 1, 2 and 3, being reversely arcuate or in the form of bows with the high arcuate portions or bows projecting toward the pressure ring 6 and the low bowed portions toward the back plate 7. The thrust ring 11 is secured to the back plate by clamping members, as screws 14, extending through the low bowed portions 13 and through the back plate and having nuts 15 on their outer ends, by means of which they can be tightened or loosened to distort the thrust ring when said nuts are tightened to cause the bowed portions 12 to be drawn in farther away from the pressure ring 6, this bowing operation being effected in conjunction with fulcrums 16 carried by the back plate and coacting with the outwardly or high bowed portions 12 at 17 near the ends of said portions 12. Loosening of the nuts 15 effects the reverse operation, or the projecting of the bowed portions 12 farther toward the pressure ring, due to the re-action of the ring under its own resiliency and the distortion due to the low portions 13 moving farther away from the back plate and tending to force the high portions 12 toward the pressure ring. Tightening of the nuts tends to shorten the ring in a circumferential direction, and loosening of the nuts to lengthen it. The shortening operation draws in the high portions and the loosening operation permits them to project farther under the resiliency of the thrust ring 11. The fulcrums 16 are provided on base plates 18 inserted between the back plate 7 and the low portions 13 of the thrust ring 11 and held from dislocation by the screws 14. Obviously by turning nuts 15, to tighten them the lower bowed portions will be pulled toward the back plate 7, causing the high portions 12 to flatten when being drawn over the fulcrums 17 and loosening of the nuts will relieve the tension tending to flatten the high portions 12 and permit the high portions to project farther toward the pressure ring.

The back plate is in the form of a cup and is secured at its rim to the member 1 by screws 19. It is also formed with slots 20 in which peripheral lugs 21 on the pressure ring 6 interlock to cause the pressure ring 6 to rotate with the driving member 1.

22 designates the links or levers between the pressure ring 6 and the thrust ring 11, each of these being in the illustrated embodiment of the invention, pivoted at one end at 23 to the pressure ring 6 and coacting at its other end with the thrust ring 11 or the high bowed portions 12 thereof, the links being provided with rollers 24 for coacting with the thrust ring. When the clutch is engaged, the link is arranged in a dead center line A—A or slightly beyond a dead center line. The dead center line is a line passing through the center or pivot 23 and the point of engagement of the roller 24 with the thrust ring 11 when the clutch is engaged, as shown in Figure 1. When the clutch is disengaged, the point of engagement of the roller 24 with the thrust ring shifts out of said dead center line into the position shown in dash lines (Figure 1) permitting the springs 9 to re-act and withdraw the pressure ring 6.

The operating mechanism, in addition to the levers 22, include radially extending arms or levers 25 and a throw-out or operating sleeve 26 movable along the clutch shaft 4 and operated by any suitable or well-known mechanism. These arms or levers 25 are secured to or rigid with the levers 22, and together therewith form a general T formation, but preferably with the arm 25, which constitutes the leg of the T formation out of right angular relation to the lever 22, constituting the head of the T formation. These arms 22 are pivotally connected or articulated to the sleeve 26, and as here shown, are formed with ball-shaped ends 27 arranged in an annular peripheral groove 28 in the sleeve 26. When the clutch is "off," the levers 22 are in the dotted line position (Figure 1) and upon thrusting or pulling of the sleeve outwardly or to the right (Figure 1), the parts move into their position shown in Figure 1, in which the levers 22 move into the dead center line A—A passing through the pivotal point 23 and the point of engagement of the roller 24 with the high portions 12 of the thrust ring 11, so that the clutch is locked in "in" position. The thrust ring or the bowed portions are resilient, so that during the movement of the levers 22 into their dead center or locking positions, they do so against some spring action. As the clutch wears, the bowed portions 12 may be projected higher by loosening the nuts 15.

In the form shown in Figures 4, 5 and 6, the thrust ring 111 is fixed to the back plate, as by rivets 30, and is formed with high and low portions 112 and 113 and initially the rollers 24 of the levers 22 coact with the low portions, but as the friction faces 5 of the disk 2 wear, the wear is compensated for by turning the entire back plate structure 70 about its axis to bring the high portions 112 in position to coact with the rollers 24.

In the illustrated embodiment of the invention, these high and low portions 112 and 113 are so arranged that the high portions are located diametrically opposite low portions, and hence when adjustment is necessary, the screws 19 by which the back plate is secured to the driving member 1, are removed, and the entire back plate given a half turn, and the screws replaced. The half turning obviously brings the high portions 12 into engagement with the rollers 24 of the levers 22. Also, in the form shown in Figure 4, the thrust ring 111 diverges outwardly from the back plate 70 toward the pressure ring 6 and the dead center line B—B of the lever 22 diverges outwardly from a line parallel to the axis of the clutch but at a right angle to the inclined face of the thrust ring. The inclined face of the thrust ring acts as a cam or wedge.

In either form of the invention, the levers 22 are substantially in a dead center line, when the clutch is engaged, so that the clutch is locked in engaged position against the resiliency of the thrust ring, and in either form of the invention, the thrust ring is adjustable to take up for wear of the faces of the clutch disk.

What we claim is:

1. In a friction clutch including driving and driven members, a pressure ring element and a back plate element rotatable with one of said members, a clutch shaft, and the other of said members being a friction disk mounted on the clutch shaft and extending between one of the members and the pressure ring element; the combination of a fulcrum ring carried by one of said elements and having high and low portions, and throw-out means comprising a lever pivoted to one of said elements and coacting with the high portion of the fulcrum ring and arranged when the clutch is engaged, so that the pivotal axis of the lever to one of said elements and the point of engagement of the lever with the fulcrum ring, are in a straight line substantially parallel to the axis of the clutch, and being shiftable on its pivot out of said center line to disengage the clutch, the fulcrum ring being resilient and the high points comprising portions bowed out of the plane of the ring toward the element to which the lever is pivoted, and means operable for varying the curvature of the outward bowed portions to compensate for wear of the friction disks.

2. In a friction clutch including driving and driven members, a pressure ring element and a back plate element rotatable with one of said members, a clutch shaft, and the other of said members being a friction disk mounted on the clutch shaft and extending between one of the members and the pressure ring element; the combination of a fulcrum ring carried by one of said elements and having high and low portions, throw-out means comprising a lever pivoted to one of said elements and coacting with the high portion of the fulcrum ring and arranged when the clutch is engaged, so that the pivotal axis of the lever to one of said elements and the point of engagement of the lever with the fulcrum ring, are in a straight line substantially parallel to the axis of the clutch the lever being shiftable out of said center line to disengage the clutch, the fulcrum ring being resilient and the high points comprising portions bowed out of the plane of the ring toward the element to which the lever is pivoted, means operable to project the bowed portions outwardly different distances to compensate for wear of the friction disk including fulcrums coacting with the bowed portions near the ends thereof, and clamping means coacting with the low portions of the fulcrum ring and operable when tightened to move the low portions toward the back plate and when loosened to permit the low portion to move away from the back plate and cause the high bowed portions to project farther toward the pressure ring element.

3. In a friction clutch including driving and driven members, a pressure ring element and a back plate element rotatable with one of said members, a clutch shaft, and the other of said members being a friction disk mounted on the clutch shaft and extending between said one of the members and the pressure ring element; the combination of a thrust ring carried by the back plate element on the inner side thereof and opposed to the pressure ring element, the thrust ring being resilient and distorted out of the general plane thereof to provide high bowed portions opposed to the pressure ring element and low bowed portions toward the back plate element, means operable on the low bowed portions to distort the ring, varying the distance the high bowed portions project toward the pressure ring element, and throw-out means including levers, each pivoted at one end to the pressure ring and coacting at its other end with one of the high portions of the thrust ring and arranged when the clutch is engaged, so that the pivotal axis of the lever to one of said elements and the point of engagement of the lever with the fulcrum ring, are in a straight line substantially parallel to the axis of the clutch the levers being shiftable out of said center lines to disengage the clutch, a throw-out sleeve slidable along the clutch shaft, and motion transmitting means between the throw-out sleeve and the levers to shift the same on their pivots.

4. In a friction clutch including driving and driven members, a pressure ring element and a back plate element rotatable with one of said members, a clutch shaft, and the other of said members being a friction disk mounted on the clutch shaft and extending between said one of the members and the pressure ring element; the combination of a thrust ring carried by the back plate element on the inner side thereof and opposed to the pressure ring element, the thrust ring being resilient and distorted out of the general plane thereof to provide high bowed portions opposed to the pressure ring element and low bowed portions toward the back plate element, means operable on the low bowed portions to distort the ring, varying the distance the high bowed portions project toward the pressure ring element, said means being operable from the outside of the back plate element, throw-out means including levers, each pivoted at one end to the pressure ring and coacting at its other end with one of the high portions of the thrust ring and arranged when the clutch is engaged, so that the pivotal axis of the lever to one of said elements and the point of engagement of the lever with the fulcrum ring, are in a straight line substantially parallel to the axis of the clutch the levers being shiftable out of said center line to disengage the clutch, a throw-out sleeve slidable along the clutch shaft, and motion transmitting means between the throw-out sleeve and the levers to shift the same on their pivots.

CHARLES B. SPASE.
ROBERT S. ROOT.